UNITED STATES PATENT OFFICE.

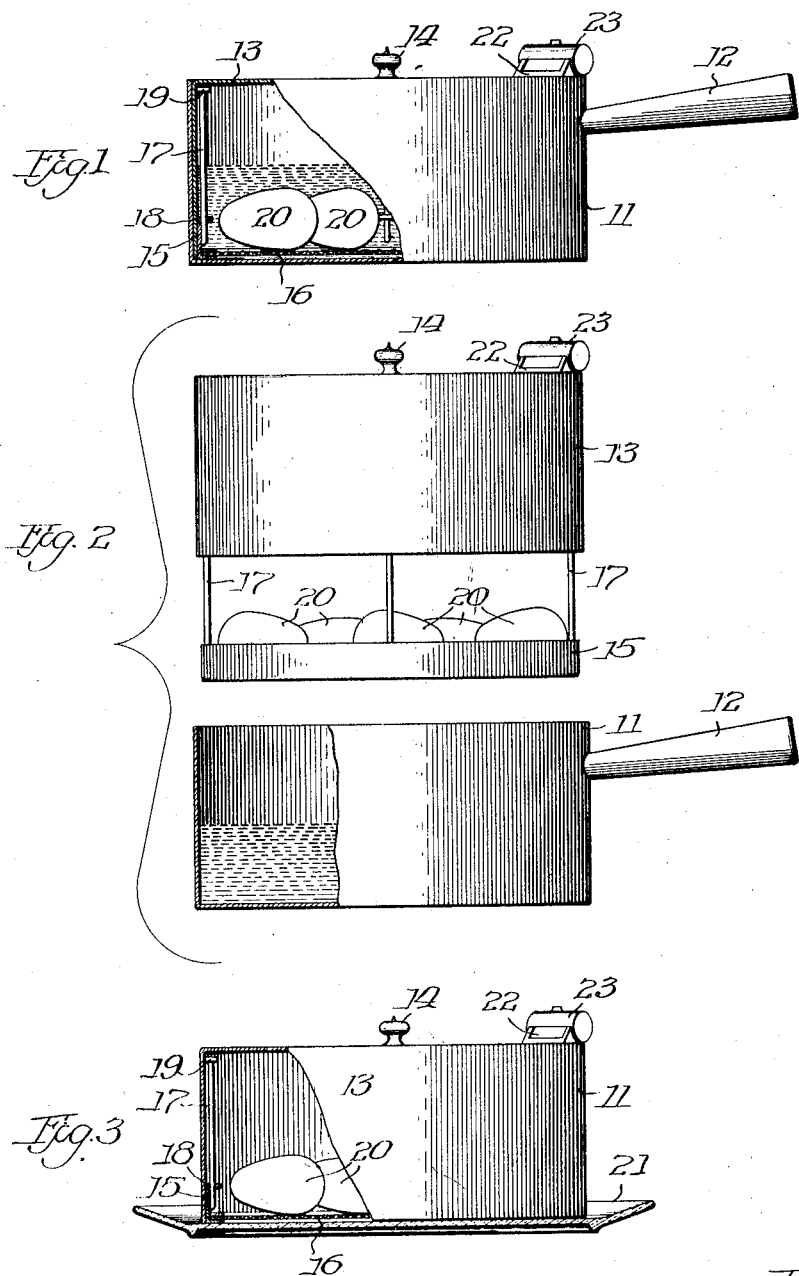

RUDOLF SEIDL, OF MINNEAPOLIS, MINNESOTA.

CULINARY DEVICE.

1,340,566.     Specification of Letters Patent.     Patented May 18, 1920.

Application filed April 24, 1916. Serial No. 93,134.

*To all whom it may concern:*

Be it known that I, RUDOLF SEIDL, a citizen of the United States, residing at Minneapolis, in the county of Hennepin and State of Minnesota, have invented certain new and useful Improvements in Culinary Devices, of which the following is a specification.

My invention relates to improvements in culinary devices such, for instance, as egg boilers and has for its object the provision therein of means to indicate the progress of the culinary operation as by the sounding of an alarm when the water within the vessel begins to boil, at which time, in the preparation of eggs, they will have attained a gelatinous consistency; and means subsequently to facilitate removal of the eggs from the hot water, draining and keeping them hot.

In order that the invention may be readily understood, one embodiment of the same is set forth in the accompanying drawing and in the following detailed description based thereon, the invention being obviously capable of embodiment in other and varied constructional forms. In the drawing—

Figure 1 is a view in side elevation of an egg boiler embodying the invention, the respective portions being assembled, with a portion broken away to show the interior construction;

Fig. 2 is a similar view with the cover and base portions disassociated; and

Fig. 3 is a similar view of the cover portion alone resting on a plate or the like.

Referring to the drawing in detail the vessel is shown as composed of a base portion 11, having a convenient handle 12 and a cover portion 13, the latter adapted to fit telescopically within the base portion and provided with a knob 14, by means of which it may be handled. An egg tray 15 having a perforate reticulate bottom 16 is fitted within the cover portion 13 and connected therewith by supporting rods 17 sliding within eyelet guides 18, the supporting rods having terminal heads 19 to limit the downward movement of the tray.

This arrangement of parts permitting of nesting or relative telescopic movement, enables the vessel to be assembled in compact relation as shown in Fig. 1, thus constituting a closed vessel, the lower portion thereof containing water within which the eggs 20 are immersed.

The vessel thus far described has many advantages which will be readily appreciated, the lifting of the cover portion 13 by means of the knob 14 serving to remove the eggs from the water, whereupon they may be removed from the tray, depending as shown in Fig. 2, or the cover portion and tray may be again telescoped one within the other by lowering upon a plate 21, as indicated in Fig. 3, keeping the eggs warm until ready to be served.

A further feature of the invention is the provision of the vessel with a single vent indicated generally at 22, for the escape of steam as soon as the water begins to boil, an alarm such as a whistle being disposed in the path of the steam through said vent and adapted to be sounded by the steam, the whistle being indicated generally at 23.

I am cognizant of the fact that alarms have been arranged to be sounded in culinary devices as by the mechanical agitation due to the ebullition of the boiling water and acting to ring a bell, as shown for instance in Patent 636,723, but I am not aware that the much more certain action of the steam itself has been utilized for this purpose. The alarm, in the present instance, cannot be accidentally sounded by reason of any jar, but can only follow the actual generation of steam.

Obviously, the suspension of the tray 15 from the cover portion 13 may be by means of flexible chains, by hinging at one side, or in any other approved manner.

I claim:

1. A culinary device comprising, in combination, a liquid container, a cover telescopically arranged with reference to the container, and a tray within the cover, the cover being adapted to be lifted from the container and the tray being adjustably connected with the cover so as to be suspended there-below when the cover is lifted or inclosed thereby when the cover is seated upon a support.

2. A culinary device comprising, in combination, a liquid container, an otherwise imperforate cover therefor provided with a vent, a whistle disposed in the vent passage, the cover being telescopically arranged with reference to the container, and a tray within the cover, the cover being adapted to be lifted from the container and the tray being adjustably connected with the cover so as to be suspended there-below when the cover is lifted or inclosed thereby when the cover is seated upon a support.

In witness whereof I have hereunto signed my name in the presence of two subscribing witnesses.

RUDOLF SEIDL.

Witnesses:
P. J. SEIDL,
F. C. BLODGETT.